United States Patent [19]

Kagimoto

[11] Patent Number: 4,750,662
[45] Date of Patent: Jun. 14, 1988

[54] PIPE WELDING ALIGNMENT TOOL
[75] Inventor: Larry A. Kagimoto, Honolulu, Hi.
[73] Assignee: Larry and Associates, Hilo, Hi.
[21] Appl. No.: 13,243
[22] Filed: Feb. 10, 1987
[51] Int. Cl.[4] ............................................. B23K 37/04
[52] U.S. Cl. .................................. 228/44.5; 228/49.3;
269/43
[58] Field of Search ................ 228/49.3, 44.5; 29/272,
29/282; 269/902, 43; 285/420; 24/277

[56] References Cited
U.S. PATENT DOCUMENTS

| 252,969 | 1/1882 | Porter | 269/43 X |
|---|---|---|---|
| 889,315 | 6/1908 | Kenyon . | |
| 1,869,778 | 8/1932 | Roberts . | |
| 2,638,676 | 5/1953 | Callahan | 269/43 X |
| 3,400,872 | 9/1968 | Rogers | 228/44.5 |
| 3,422,519 | 1/1969 | Fehlman . | |
| 3,566,507 | 3/1971 | Jacobsen . | |
| 4,074,897 | 2/1978 | Behn | 269/43 |
| 4,262,943 | 4/1981 | Armstrong | 24/277 X |
| 4,415,188 | 11/1983 | Ginter, Jr. . | |
| 4,524,959 | 6/1985 | Kubo | 269/43 |

FOREIGN PATENT DOCUMENTS 659331 4/1979 U.S.S.R. .

Primary Examiner—M. Jordan
Assistant Examiner—Carmine Cuda
Attorney, Agent, or Firm—Fleit, Jacobson, Cohn & Price

[57] ABSTRACT

A pipe clamping and alignment tool for locating and clamping pipe sections in accurate end to end alignment for welding has a pair of clamping assemblies for the respective pipe sections threaded respectively on opposite-hand threads of a turnbuckle-type bolt. Each clamping assembly has a cradle for receiving the respective pipe section, a releasable U-bolt clamp for holding the pipe section on the cradle, and pairs of angled adjusting screws for engaging the pipe section and adjusting its alignment both longitudinally and laterally.

8 Claims, 1 Drawing Sheet

PIPE WELDING ALIGNMENT TOOL

BACKGROUND AND SUMMARY OF THE INVENTION

This invention relates to an alignment tool for use in accurately aligning and holding in place two sections of pipe, so that the sections may be coupled end to end by a welding or analogous operation.

Objects of the invention include, for example, the provision of an alignment tool which can align and hold in place pipe sections of like or different size, the provision of an alignment tool having means whereby the alignment of the respective pipe sections can readily be adjusted, the sections drawn together end to end, and clamped in accurately aligned positions for welding, and the provision of an alignment tool as aforesaid which can readily be manufactured from readily available materials.

In pursuit of the above and other objects, the invention provides a pipe clamping and alignment tool comprising a pair of clamping assemblies for the respective pipe sections which assemblies are threaded on opposite-hand threads of a turnbuckle-type bolt so that the clamping assemblies can be drawn toward or away from one another by rotation of the bolt in one or the other direction. Each clamping assembly may, for example, include a plate on which is located an elongate cradle substantially parallel to the bolt for receiving the respective pipe section, a releasable clamp such as a U-bolt, the ends of which extend through apertures in the plate and receive nuts thereon for clamping the pipe section on the cradle, and alignment means such as pairs of angled screws extending through the plate on opposite sides of and at opposite ends of the cradle for engaging the pipe section and selectively adjusting the alignment thereof both lengthwise and laterally by suitable tightening of the screws.

In use, the respective pipe sections may be secured to the respective clamp assemblies by means of the U-bolts, drawn together end to end by appropriate rotation of the turnbuckle-type bolt, then accurately aligned via the adjustment screws and tightly clamped for welding, by tightening the U-bolts. After welding, the coupled sections can be readily removed by loosening and possible removal of the U-bolts.

These together with other objects and advantages which will become subsequently apparent reside in the details of construction and operation as more fully hereinafter described and claimed, reference being had to the accompanying drawings forming a part hereof, wherein like numerals refer to like parts throughout.

DISCLOSURE STATEMENT

Figure 1:
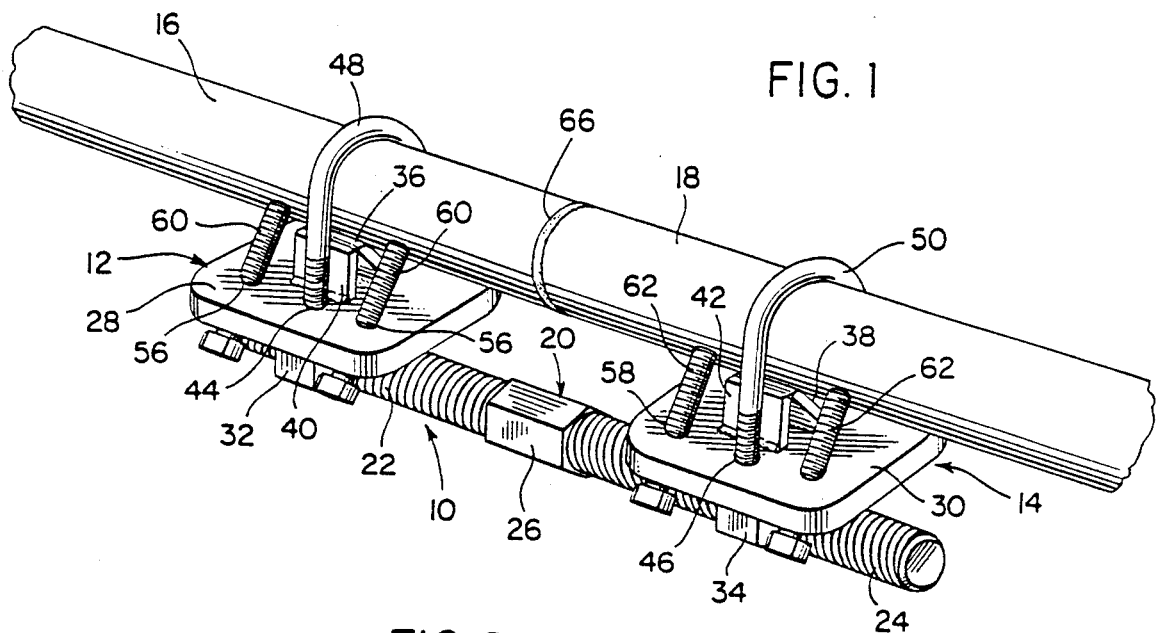
FIG. 1 is a perspective in-use view of a pipe clamping and alignment tool in accordance with the invention.
Figure 2:
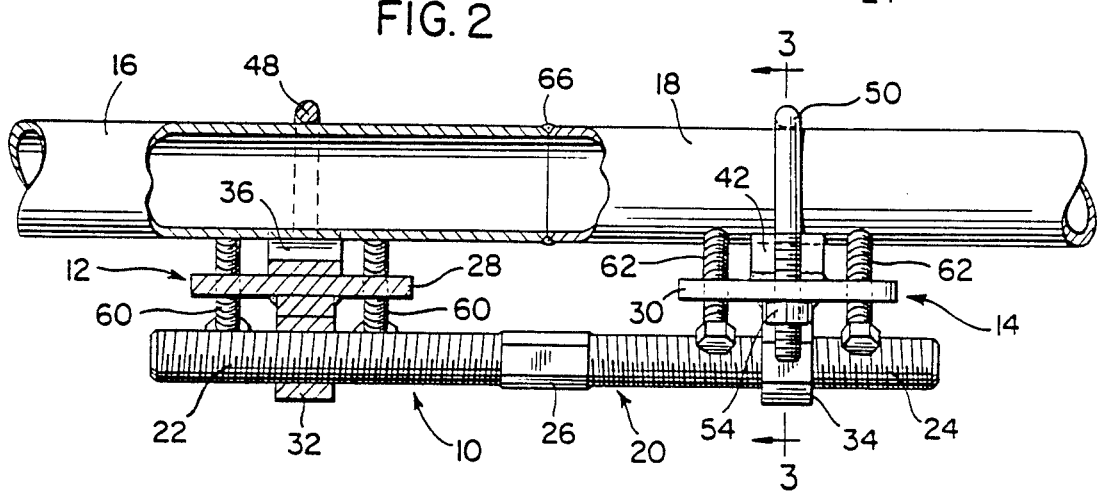
FIG. 2 is an elevational in-use view of the tool.
Figure 3:
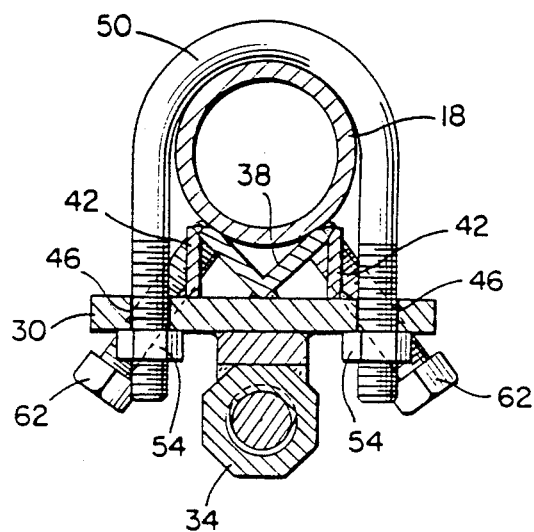
FIG. 3 is an enlarged sectional view on line 3—3 of FIG. 2.
Figure 4:
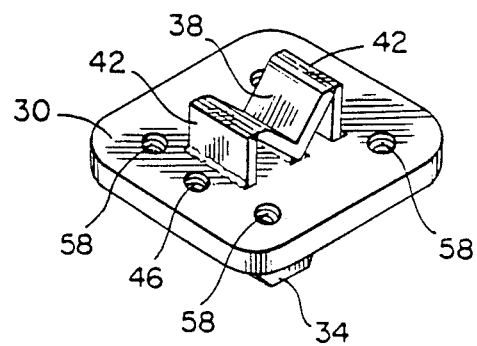
FIG. 4 is a perspective view of one part of the tool forming an element of a clamping assembly.

Applicant is aware of the following U.S. patents pertaining to pipe clamping devices and the like. None of these patents, however, discloses a device having the features of the present invention.

| | |
|---|---|
| 889,315 | June 2, 1908 |
| 1,869,778 | Aug. 2, 1932 |
| 3,422,519 | Jan. 21, 1969 |
| 3,566,507 | Mar. 2, 1971 |
| 4,415,188 | Nov. 15, 1983 |

DESCRIPTION OF THE PREFERRED EMBODIMENT

A pipe clamping and alignment tool 10 in accordance with the invention generally comprises a pair of clamping assemblies 12, 14 for respective pipe sections 16, 18, and a turnbuckle-type bolt 20 carrying the clamping assemblies, the bolt having oppositely threaded ends 22, 24 and an hexagonal central section 26.

The respective clamping assemblies include respective plates 28, 30 underneath of which are welded respective nuts 32, 34 for threaded receipt on the respective ends 22, 24 of bolt 20, and on top of which are welded respective angle-section pieces 36, 38 (between support webs 40, 42) forming elongate V-shaped cradles parallel to bolt 20 for receiving the respective pipe sections 16, 18. Adjacent the cradles, plates 28, 30 are provided with apertures 44, 46 which receive the threaded ends of U-shaped clamping bolts 48, 50 secured by nuts 54 under the respective plates and extending over the cradles. Beyond opposite ends and outside of the cradles 36, 38, plates 28, 30 are further provided with pairs of inwardly angled threaded apertures 56, 58 for angled alignment adjusting screws 60, 62, the angles of the screws, for example, being about 60° to the vertical.

In use, the respective pipe sections 16, 18 may be inserted through the respective clamping bolts 48, 50 to rest on the cradles 36, 38. The inner ends of the pipe sections to be welded should be facing each other and extend approximately the same distance from the respective clamping bolts to the center of bolt 20, with said ends close together but not touching. Adjustments may then be made to one or both sets of adjustment screws 60, 62 to align the pipe sections. When the alignment has been set, the pipes are drawn together by turning bolt 20. If necessary, further adjustments may be made to screws 60, 62 to insure accurate alignment, and the nuts 52, 54 and clamping bolts 48, 50 are tightened to hold the pipe sections securely in place. It will be understood that screws 60, 62 allow alignment of the pipe sections to be adjusted both lengthwise and laterally. The pipe sections are then welded as indicated by weld seam 66. After welding, the welded pipe may be removed either by loosening the clamping bolts and sliding the pipe out of the assembly, or by removing the clamping bolts and lifting the welded pipe off the cradles.

It will be understood that the provision, inter alia, of the U-shaped adjustable clamping bolts allowed pipe sections of like or different size to be accurately aligned and clamped in place, and the device clearly can be made in a variety of different sizes to suit different applications.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pipe clamping and alignment tool comprising a pair of clamping assemblies for respective pipe sections, the clamping assemblies being threaded respectively on opposite-hand threads of a turnbuckle-type bolt so that the clamping assemblies can be drawn toward or away from one another by rotation of the bolt in one or other direction, each clamping assembly including a plate on which is located an elongate cradle substantially parallel to said turnbuckle-type bolt for receiving the respective pipe section, a releasable U-shaped clamping bolt with threaded ends for receipt in respective apertures in the plate on opposite sides of the cradle, and nuts for receipt on the threaded ends of the U-shape clamping bolt under the plate, said U-shaped clamping bolt for clamping the pipe section on the cradle, and adjustable alignment means associated with the plate for engaging the pipe section and selectively adjusting the alignment thereof lengthwise and laterally.

2. The invention as defined in claim 1 wherein the alignment means for each clamping assembly comprises pairs of inwardly angled adjustment screws in threaded angled apertures of the plate at opposite ends of and on opposite sides of the cradle.

3. The invention as defined in claim 2 wherein the alignment screws are angled inwardly at about 60°.

4. The invention as defined in claim 1 wherein each cradle is formed by an angle section element located to define a V-shaped cradle and support webs on opposite sides of said element.

5. The invention as defined in claim 1 wherein the clamping asemblies are threaded on the respective threads of the turnbuckle-type bolt by means of a nut welded under the respective plate.

6. The invention as defined in claim 1 wherein the turnbuckle-type bolt includes an hexagonal section between the threads.

7. A pipe clamping and alignment tool for locating a pair of pipe sections end to end while performing an operation such as welding thereon, the tool comprising a pair of clamping assemblies for the respective pipe sections, the assemblies being threaded respectively on opposite-hand threads of a turnbuckle-type bolt so that the assemblies can be drawn together by rotation of the turnbuckle-type bolt in one direction, each clamping assembly including a plate provided with an elongate cradle substantially parallel to the bolt for receiving the respective pipe section, U-shape clamping bolt with threaded ends receivable in apertures in the plate on opposite sides of the cradle, nuts for threading on the ends of the U-shape clamping bolt under the plate with the U-shape clamping bolt extending over the cradle to form a releasable clamp for the pipe section, and pairs of alignment screws threaded in inwardly angled apertures in the plate at opposite ends of the cradle for engaging the pipe section and adjusting the alignment thereof both longitudinally and laterally.

8. A tool for securing two workpieces in alignment and in adjacent relation while performing a work operation requiring access to peripheral surface areas of the portions of the workpieces disposed in adjacent relation, said tool comprising a pair of plates, means on each plate to adjustably and rigidly attach the plate to a workpiece in spaced relation to the portions of the workpieces disposed in adjacent relation, and means interconnecting said plates for adjustable movement toward and away from each other to adjust the adjacent portions of of the workpieces toward and away from each other, said means attaching each plate to the workpiece including a clamp member having a central portion engaging the surface of the workpiece remote from the plate and end portions adjustably connected to the plate to selectively move the workpiece toward the plate, said plate including two pairs of threaded apertures with the apertures of each pair being inclined in converging relation toward the workpiece, an externally threaded support member mounted in each aperture with the converging ends of the support members adjustably engaging the workpiece in opposed relation to the central portion of the clamp member, the converging ends of the support members being spaced from each other and the clamp member being disposed centrally between the pairs of support members to enable workpieces having different external physical characteristics to be rigidly, angularly and lateral adjustably attached to said plates, said means interconnecting said plates including an elongated rigid externally threaded rod having oppositely threaded end portions, an internally threaded nut rigidly mounted on each plate with the nuts being in threaded engagement with the end portions of the threaded rod for movement of said plates toward and away from each other in response to rotational movement of the threaded rod thereby moving the adjacent portions of the workpieces toward and away from each other, said threaded rod being disposed on the opposite side of the plates from the workpieces and being spaced laterally from the workpieces, said threaded rod being the sole connection between the plates thereby providing unobstructed access completely around the peripheral surfaces of the adjacent portions of the workpieces except for the area occupied by the threaded rod to enable a work operation to be performed.

* * * * *